March 8, 1932.                D. W. McINTYRE                1,848,261
                      BLEED VALVE FOR HOSE COUPLINGS
                           Filed Aug. 26, 1929
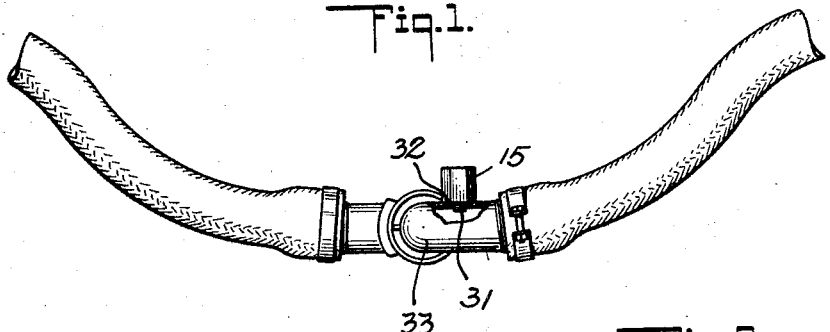
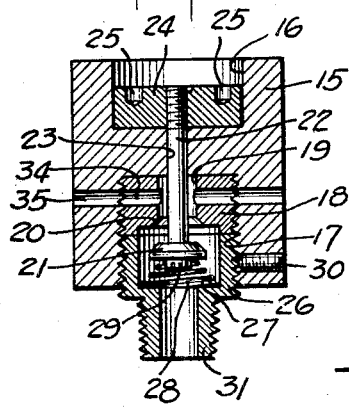   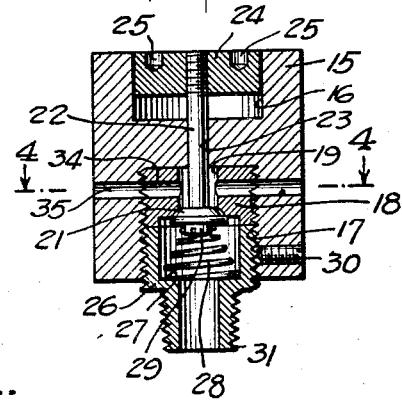
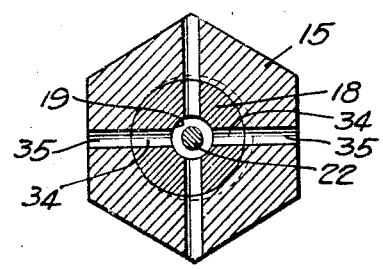
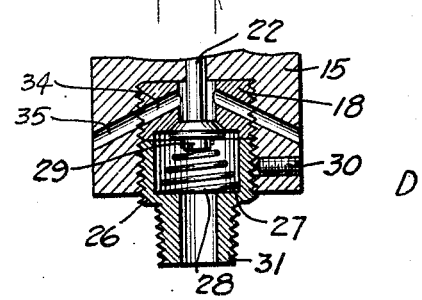
INVENTOR
W. McINTYRE
BY
ATTORNEYS Patented Mar. 8, 1932

1,848,261

UNITED STATES PATENT OFFICE

DOUGAL W. McINTYRE, OF YUMA, ARIZONA

BLEED VALVE FOR HOSE COUPLINGS

Application filed August 26, 1929. Serial No. 388,517.

My invention relates to hose as used between railway cars for connecting the air or steam line from one car to another. The manual uncoupling of these hose connections incident to uncoupling one car from another is rendered extremely difficult by the pressure of fluid which acts at the coupling to resist uncoupling. Although the angle cocks are closed before uncoupling, there still remains fluid of high pressure in the hose, and as a consequence, when the hose are uncoupled the sudden release of fluid reacts to throw the hose which often results in personal injury to the operator.

It is a purpose of my invention to provide a valve in association with a conventional hose coupling which is manually operable preceding uncoupling to bleed the hose of fluid pressure and to thus remove any resistance offered by the fluid to uncoupling as well as to prevent the fluid from throwing the hose and injuring the operator.

I will describe only one form of valve embodying my invention and will then point out the novel features thereof in claims.

In the accompanying drawings:

Fig. 1 is a view showing in side elevation one form of valve embodying my invention in applied position to a hose coupling, a portion of the coupling being broken away to reveal the connection between the coupling and the valve.

Fig. 2 is an enlarged vertical sectional view of the valve shown in Fig. 1, and Fig. 3 is a similar view showing the valve in closed position as distinguished from the open position shown in Fig. 2.

Fig. 4 is a transverse sectional view taken on the line 4—4 of Fig. 3.

Fig. 5 is a fragmentary sectional view showing a modified form of valve adapted for use in conjunction with steam lines.

In carrying out my invention, I provide a body 15 preferably of hexagonal form in cross section as shown in Fig. 4 in order that a wrench may be applied thereto for turning the body to apply or remove the valve to or from a hose coupling. As shown in Figs. 2 and 3, the body 15 is formed at its top portion with a pocket 16 opening upwardly, and a pocket 17 opening downwardly and threadedly receiving a ring shaped member 18 the center of which defines a port 19 through which fluid is adapted to pass. The lower side of the member 18 is constructed to provide a seat 20 for a valve 21, the latter being formed on the lower end of a stem 22 which passes upwardly through the port 19 through an opening 23 and into the pocket 16, the upper end of the stem being screw threaded to receive an actuating head 24. The head 24 has a sliding fit within the pocket 16 and its upper side is formed at diametrically opposed points with recesses 25 adapted to receive a spanner wrench by which the head may be applied to or removed from the stem in assembling or disassembling the parts of the valve.

A plug 26 of annular form is threaded within the pocket 17 to have abutting relation with respect to the member 18 and to coact therewith in defining a chamber 27 through which fluid is adapted to pass into the port 19 when the valve 21 is in open position. An expansible spring 28 is positioned within the chamber 27 to engage the valve 21 and to thus urge the latter to closed position on the seat 20, a centering head 29 being formed at the lower side of the valve for maintaining the spring centered with respect to the valve so that the proper seating of the valve will be effected.

The plug 26 is locked within the body by means of a set screw 30, and it is formed integral with a nipple 31 which projects from the bottom of the body and is exteriorly threaded for engagement with the walls of the port 32 in one part of a hose coupling 33, as illustrated in Fig. 1. Thus with the valve applied to the hose coupling the port 32 is placed in communication with the chamber 27 through the nipple 31, and when the valve 21 is open as shown in Fig. 2 fluid from the coupling is free to pass into the port 19. From the port 19 the fluid can exhaust to atmosphere through ducts 34 and 35 formed in the member 18 and body 15, respectively, and which ducts are in registration with each other when the member 18 is properly positioned within the body. The ducts may be formed after the member 18 is applied within the body by drilling through the body as will be understood, and in this manner the ducts 34 will be in registration with the ducts 35 to form unobstructed outlets for the fluid entering the port 19.

In operation, the valve 21 in addition to being held in closed position by the spring 28 is maintained on its seat by reason of the fluid pressure acting thereagainst, and as a consequence, the valve is firmly held in closed position to prevent the escape of fluid to atmosphere. Thus, my invention in no way effects the normal operation of hose couplings for fluid lines so that when the parts of the hose coupling are connected the fluid is free to pass from one hose to the other and without the possibility of the fluid escaping through the valve. When desiring to uncouple the parts of the coupling and following closure of the angle cocks to cut off fluid from the source of supply, the operator presses the head 24 inwardly of the pocket 16 thereby moving the valve 21 to open position as shown in Fig. 2 and against the action of the fluid pressure and that of the spring. Once the valve is opened the interior of the hose coupling is placed in communication with the port 19 so that that fluid pressure remaining in the coupling and hose is exhausted to atmosphere through the ducts 34 and 35. With the coupling relieved of fluid pressure, the parts of the coupling may now be readily disconnected and without fear of the parts being thrown and injuring the operator.

It will be understood that once the head 24 is relieved of inward pressure, the spring 28 serves to return the valve to closed position so that when reconnecting the parts of the coupling for conveying fluid pressure from one railway car to another fluid pressure cannot escape through the port 32.

In Fig. 5 I have shown a modification which is particularly designed for use in connection with hose couplings for steam lines. In this embodiment of my invention the ducts 34 and 35 are inclined toward the base of the body 15 so that the steam exhausted to atmosphere through these ducts will be directed in jets away from the operator to eliminate the possibility of the operator being scalded.

Although I have herein shown and described only one form of valve embodying my invention, it is to be understood that various changes and modifications may be made herein without departing from the spirit of the invention and the spirit and scope of the appended claims.

I claim:

1. A valve for bleeding hose couplings for fluid pressure lines, comprising a body the opposite faces of which are formed with pockets, a member secured within one of the pockets and having a port therein, registering ducts in the member and body communicating with said port, said body being formed with an opening providing communication between the pockets, a plug secured within the same pocket as the member, said plug defining a chamber, a nipple on the plug for mounting the body on a hose coupling and providing communication between said chamber and the interior of the coupling, a valve movable in the chamber to control said port, a stem on the valve movable through said opening and into the other pocket, and a head movable in the last mentioned pocket and connected to said stem for actuating the latter to move said valve.

2. A valve as embodied in claim 1 wherein the member and plug are threaded in the first named pocket, the valve comprising a head, and a spring disposed in the chamber and engaging the last named head for yieldably urging the valve to closed position in respect to said port.

3. A valve as embodied in claim 1 wherein the head movable in the last named pocket is threaded on the steam and provided with spaced openings adapted for the reception of a spanner wrench.

DOUGAL W. McINTYRE.